United States Patent
Salomonsson et al.

(10) Patent No.: US 10,328,868 B2
(45) Date of Patent: *Jun. 25, 2019

(54) VEHICLE VISION SYSTEM WITH WINDSHIELD MOUNTED CAMERA

(71) Applicant: MAGNA ELECTRONICS INC., Auburn Hills, MI (US)

(72) Inventors: Ove J. Salomonsson, Farmington Hills, MI (US); Christopher L. Van Dan Elzen, Rochester, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/117,105

(22) Filed: Aug. 30, 2018

(65) Prior Publication Data

US 2019/0031117 A1    Jan. 31, 2019

Related U.S. Application Data (63) Continuation of application No. 15/878,579, filed on Jan. 24, 2018, now Pat. No. 10,065,575, which is a
(Continued)

(51) Int. Cl.
*H04N 5/232* (2006.01)
*B60R 11/04* (2006.01)
(Continued)

(52) U.S. Cl.
CPC .............. *B60R 11/04* (2013.01); *B60Q 1/143* (2013.01); *B60R 1/00* (2013.01); *G02B 5/20* (2013.01);
(Continued)

(58) Field of Classification Search
None
See application file for complete search history.

(56) References Cited

U.S. PATENT DOCUMENTS

| 4,634,884 A | 1/1987 | Hayashimoto |
| 5,096,287 A * | 3/1992 | Kakinami ................. B60R 1/12 352/131 |

(Continued)

FOREIGN PATENT DOCUMENTS

| DE | 102008044003 A1 | 5/2010 |
| DE | 102010023593 A1 | 12/2011 |

(Continued)

OTHER PUBLICATIONS

International Search Report and Written Opinion dated Jul. 23, 2012 for corresponding PCT Application No. PCT/US2012/34236.

*Primary Examiner* — Eileen M Adams
(74) *Attorney, Agent, or Firm* — Honigman LLP (57) ABSTRACT

A vision system for a vehicle includes a camera having a field of view exterior of the vehicle and being operable to capture image data. An angular filter is disposed at least partially in the field of view of the camera. The angular filter limits reflection of light through an angular range that corresponds to stray light that would otherwise impinge the lens of the camera. A control includes an image processor operable to process image data captured by the camera. Responsive at least in part to processing at the image processor of image data captured by the camera, the control controls a driver assistance system of the vehicle.

19 Claims, 3 Drawing Sheets

Related U.S. Application Data continuation of application No. 15/494,646, filed on Apr. 24, 2017, now Pat. No. 9,878,679, which is a continuation of application No. 15/180,643, filed on Jun. 13, 2016, now Pat. No. 9,630,570, which is a continuation of application No. 14/112,343, filed as application No. PCT/US2012/034236 on Apr. 19, 2012, now Pat. No. 9,380,219.

(60) Provisional application No. 61/477,315, filed on Apr. 20, 2011.

(51) Int. Cl.
| | |
|---|---|
| *H04N 5/225* | (2006.01) |
| *B60Q 1/14* | (2006.01) |
| *G03B 11/00* | (2006.01) |
| *B60R 1/00* | (2006.01) |
| *H04N 5/235* | (2006.01) |
| *G02B 5/20* | (2006.01) |
| *B60R 11/00* | (2006.01) |

(52) U.S. Cl.
CPC ........... *G03B 11/00* (2013.01); *H04N 5/2252* (2013.01); *H04N 5/2358* (2013.01); *B60R 2011/0026* (2013.01); *B60R 2300/00* (2013.01); *B60R 2300/804* (2013.01); *B60R 2300/8086* (2013.01); *B60R 2300/8093* (2013.01)

(56) References Cited

U.S. PATENT DOCUMENTS

| | | | |
|---|---|---|---|
| 5,098,287 | A | 3/1992 | Duncan et al. |
| 5,130,804 | A | 7/1992 | Tamura |
| 5,204,615 | A | 4/1993 | Richards |
| 5,550,677 | A | 8/1996 | Schofield et al. |
| 5,670,935 | A | 9/1997 | Schofield et al. |
| 5,796,094 | A | 8/1998 | Schofield et al. |
| 5,877,897 | A | 3/1999 | Schofield et al. |
| 5,920,061 | A | 7/1999 | Feng |
| 5,949,331 | A | 9/1999 | Schofield et al. |
| 6,087,953 | A | 7/2000 | DeLine et al. |
| 6,097,023 | A | 8/2000 | Schofield et al. |
| 6,124,886 | A | 9/2000 | DeLine et al. |
| 6,151,065 | A | 11/2000 | Steed |
| 6,172,613 | B1 | 1/2001 | DeLine et al. |
| 6,243,003 | B1 | 6/2001 | DeLine et al. |
| 6,250,148 | B1 | 6/2001 | Lynam |
| 6,259,475 | B1 | 7/2001 | Ramachandran et al. |
| 6,278,377 | B1 | 8/2001 | DeLine et al. |
| 6,313,454 | B1 | 11/2001 | Bos et al. |
| 6,320,176 | B1 | 11/2001 | Schofield et al. |
| 6,326,613 | B1 | 12/2001 | Heslin et al. |
| 6,329,925 | B1 | 12/2001 | Skiver et al. |
| 6,341,523 | B2 | 1/2002 | Lynam |
| 6,353,392 | B1 | 3/2002 | Schofield et al. |
| 6,396,397 | B1 | 5/2002 | Bos et al. |
| 6,420,975 | B1 | 7/2002 | DeLine et al. |
| 6,428,172 | B1 | 8/2002 | Hutzel et al. |
| 6,445,287 | B1 | 9/2002 | Schofield et al. |
| 6,466,136 | B2 | 10/2002 | DeLine et al. |
| 6,498,620 | B2 | 12/2002 | Schofield et al. |
| 6,501,387 | B2 | 12/2002 | Skiver et al. |
| 6,559,435 | B2 | 5/2003 | Schofield et al. |
| 6,593,565 | B2 | 7/2003 | Heslin et al. |
| 6,690,268 | B2 | 2/2004 | Schofield et al. |
| 6,768,422 | B2 | 7/2004 | Schofield et al. |
| 6,774,356 | B2 | 8/2004 | Heslin et al. |
| 6,795,237 | B1 | 9/2004 | Marinelli et al. |
| 6,806,452 | B2 | 10/2004 | Bos et al. |
| 6,822,563 | B2 | 11/2004 | Bos et al. |
| 6,824,281 | B2 | 11/2004 | Schofield et al. |
| 6,831,261 | B2 | 12/2004 | Schofield et al. |
| 6,953,253 | B2 | 10/2005 | Schofield et al. |
| 6,968,736 | B2 | 11/2005 | Lynam |
| 7,004,593 | B2 | 2/2006 | Weller et al. |
| 7,095,572 | B2 | 8/2006 | Lee et al. |
| 7,188,963 | B2 | 3/2007 | Schofield et al. |
| 7,205,904 | B2 | 4/2007 | Schofield |
| 7,215,479 | B1 | 5/2007 | Bakin |
| 7,262,406 | B2 | 8/2007 | Heslin et al. |
| 7,265,342 | B2 | 9/2007 | Heslin et al. |
| 7,289,037 | B2 | 10/2007 | Uken et al. |
| 7,311,406 | B2 | 12/2007 | Schofield et al. |
| 7,325,934 | B2 | 2/2008 | Schofield et al. |
| 7,339,149 | B1 | 3/2008 | Schofield et al. |
| 7,344,261 | B2 | 3/2008 | Schofield et al. |
| 7,355,524 | B2 | 4/2008 | Schofield |
| 7,388,182 | B2 | 6/2008 | Schofield et al. |
| 7,402,786 | B2 | 7/2008 | Schofield et al. |
| 7,420,159 | B2 | 9/2008 | Heslin et al. |
| 7,423,248 | B2 | 9/2008 | Schofield et al. |
| 7,425,076 | B2 | 9/2008 | Schofield et al. |
| 7,480,149 | B2 | 1/2009 | DeWard et al. |
| 7,526,103 | B2 | 4/2009 | Schofield et al. |
| 7,533,998 | B2 | 5/2009 | Schofield et al. |
| 7,536,316 | B2 | 5/2009 | Ozer et al. |
| 7,551,103 | B2 | 6/2009 | Schofield |
| 7,579,939 | B2 | 8/2009 | Schofield et al. |
| 7,616,781 | B2 | 11/2009 | Schofield et al. |
| 7,655,894 | B2 | 2/2010 | Schofield et al. |
| 7,679,498 | B2 | 3/2010 | Pawlicki et al. |
| 7,697,027 | B2 | 4/2010 | McMahon et al. |
| 7,728,721 | B2 | 6/2010 | Schofield et al. |
| 7,877,175 | B2 | 1/2011 | Higgins-Luthman |
| 7,888,629 | B2 | 2/2011 | Heslin et al. |
| 7,916,009 | B2 | 3/2011 | Schofield et al. |
| 7,918,570 | B2 | 4/2011 | Weller et al. |
| 7,946,505 | B2 | 5/2011 | Lynam et al. |
| 7,965,336 | B2 | 6/2011 | Bingle et al. |
| 7,972,045 | B2 | 7/2011 | Schofield |
| 7,994,462 | B2 | 8/2011 | Schofield et al. |
| 8,063,759 | B2 | 11/2011 | Bos et al. |
| 8,070,332 | B2 | 12/2011 | Higgins-Luthman et al. |
| 8,090,153 | B2 | 1/2012 | Schofield et al. |
| 8,142,059 | B2 | 3/2012 | Higgins-Luthman et al. |
| 8,162,518 | B2 | 4/2012 | Schofield |
| 8,179,437 | B2 | 5/2012 | Schofield et al. |
| 8,194,133 | B2 | 6/2012 | DeWind et al. |
| 8,203,440 | B2 | 6/2012 | Schofield et al. |
| 8,222,588 | B2 | 7/2012 | Schofield et al. |
| 8,223,203 | B2 | 7/2012 | Ohsumi et al. |
| 8,239,086 | B2 | 8/2012 | Higgins-Luthman |
| 8,254,011 | B2 | 8/2012 | Baur et al. |
| 8,256,821 | B2 | 9/2012 | Lawlor et al. |
| 8,289,142 | B2 | 10/2012 | Pawlicki et al. |
| 8,294,608 | B1 | 10/2012 | Lynam |
| 8,314,689 | B2 | 11/2012 | Schofield et al. |
| 8,324,552 | B2 | 12/2012 | Schofield et al. |
| 8,325,986 | B2 | 12/2012 | Schofield et al. |
| 8,339,453 | B2 | 12/2012 | Blake, III et al. |
| 8,355,839 | B2 | 1/2013 | Schofield et al. |
| 8,376,595 | B2 | 2/2013 | Higgins-Luthman |
| 8,386,114 | B2 | 2/2013 | Higgins-Luthman |
| 8,405,725 | B2 | 3/2013 | McMahon et al. |
| 8,405,726 | B2 | 3/2013 | Schofield et al. |
| 8,451,332 | B2 | 5/2013 | Rawlings |
| 8,513,590 | B2 | 8/2013 | Heslin et al. |
| 8,529,075 | B2 | 9/2013 | Yamada et al. |
| 8,531,278 | B2 | 9/2013 | DeWard et al. |
| 8,534,887 | B2 | 9/2013 | DeLine et al. |
| 8,542,451 | B2 | 9/2013 | Lu et al. |
| 8,629,768 | B2 | 1/2014 | Bos et al. |
| 8,665,079 | B2 | 3/2014 | Pawlicki et al. |
| 8,743,203 | B2 | 6/2014 | Karner et al. |
| 8,851,690 | B2 | 10/2014 | Uken et al. |
| 8,944,655 | B2 | 2/2015 | Verrat-Debailleul et al. |
| 9,150,165 | B1 | 10/2015 | Fortin et al. |
| 9,156,403 | B2 | 10/2015 | Rawlings et al. |
| 9,277,104 | B2 | 3/2016 | Sesti et al. |
| 9,380,219 | B2 * | 6/2016 | Salomonsson ............ B60R 1/00 |
| 9,451,138 | B2 | 9/2016 | Winden et al. |

(56) References Cited

U.S. PATENT DOCUMENTS

| | | |
|---|---|---|
| 9,487,159 B2 | 11/2016 | Achenbach |
| 9,596,387 B2 | 3/2017 | Achenbach et al. |
| 9,630,570 B2 | 4/2017 | Salomonsson et al. |
| 9,871,971 B2 | 1/2018 | Wang et al. |
| 9,878,679 B2 | 1/2018 | Salomonsson et al. |
| 10,065,575 B2 * | 9/2018 | Salomonsson ............ B60R 1/00 |
| 2002/0003571 A1 | 1/2002 | Schofield et al. |
| 2002/0156559 A1 | 10/2002 | Stam et al. |
| 2003/0169522 A1 | 9/2003 | Schofield et al. |
| 2004/0189862 A1 | 9/2004 | Gustavsson et al. |
| 2005/0083590 A1 | 4/2005 | Tanigawa et al. |
| 2005/0141106 A1 | 6/2005 | Lee et al. |
| 2006/0050018 A1 | 3/2006 | Hutzel et al. |
| 2006/0061008 A1 | 3/2006 | Karner et al. |
| 2006/0077575 A1 | 4/2006 | Nakai et al. |
| 2006/0103727 A1 | 5/2006 | Tseng |
| 2006/0202038 A1 | 9/2006 | Wang et al. |
| 2007/0109406 A1 | 5/2007 | Schofield et al. |
| 2007/0120657 A1 | 5/2007 | Schofield et al. |
| 2007/0221826 A1 * | 9/2007 | Bechtel ............... G02B 3/005 250/208.1 |
| 2008/0247751 A1 | 10/2008 | Lang et al. |
| 2008/0252882 A1 * | 10/2008 | Kesterson ............ G02B 5/208 356/300 |
| 2009/0208058 A1 | 8/2009 | Schofield et al. |
| 2009/0295181 A1 | 12/2009 | Lawlor et al. |
| 2010/0110192 A1 | 5/2010 | Johnston et al. |
| 2010/0118146 A1 | 5/2010 | Schofield et al. |
| 2010/0134616 A1 | 6/2010 | Seger et al. |
| 2010/0165468 A1 | 7/2010 | Yamada et al. |
| 2010/0279439 A1 | 11/2010 | Shah et al. |
| 2010/0283581 A1 | 11/2010 | Heigl |
| 2011/0025850 A1 | 2/2011 | Maekawa et al. |
| 2011/0035120 A1 | 2/2011 | Taylor et al. |
| 2012/0008129 A1 | 1/2012 | Lu et al. |
| 2012/0013741 A1 | 1/2012 | Blake, III et al. |
| 2012/0069185 A1 | 3/2012 | Stein |
| 2012/0081550 A1 | 4/2012 | Sewell |
| 2012/0182425 A1 | 7/2012 | Higgins-Luthman et al. |
| 2012/0265416 A1 | 10/2012 | Lu et al. |
| 2013/0002873 A1 | 1/2013 | Hess |
| 2013/0044021 A1 | 2/2013 | Lynam |
| 2014/0015977 A1 * | 1/2014 | Taylor ................ B60C 23/0408 348/148 |
| 2014/0043465 A1 | 2/2014 | Salomonsson et al. |
| 2014/0160284 A1 | 6/2014 | Achenbach et al. |
| 2014/0226012 A1 | 8/2014 | Achenbach |
| 2015/0015713 A1 | 1/2015 | Wang et al. |
| 2015/0251605 A1 | 9/2015 | Uken et al. |

FOREIGN PATENT DOCUMENTS

| | | |
|---|---|---|
| EP | 0889801 A1 | 1/1999 |
| EP | 1025702 A1 | 8/2000 |
| EP | 1504276 A2 | 2/2005 |
| JP | 2007243550 A | 9/2007 |
| WO | 2008024639 A2 | 2/2008 |
| WO | 2008127752 A2 | 10/2008 |
| WO | 2009046268 A1 | 4/2009 |
| WO | 2010/111465 A1 | 9/2010 |
| WO | 2013/019795 A1 | 2/2013 |
| WO | 2013/081984 A1 | 6/2013 |
| WO | 2013/081985 A1 | 6/2013 |
| WO | 2013/123161 A1 | 8/2013 |

* cited by examiner

VEHICLE VISION SYSTEM WITH WINDSHIELD MOUNTED CAMERA

CROSS REFERENCE TO RELATED APPLICATIONS

The present application is a continuation of U.S. patent application Ser. No. 15/878,579, filed Jan. 24, 2018, now U.S. Pat. No. 10,065,575, which is a continuation of U.S. patent application Ser. No. 15/494,646, filed Apr. 24, 2017, now U.S. Pat. No. 9,878,679, which is a continuation of U.S. patent application Ser. No. 15/180,643, filed Jun. 13, 2016, now U.S. Pat. No. 9,630,570, which is a continuation of U.S. patent application Ser. No. 14/112,343, filed Oct. 17, 2013, now U.S. Pat. No. 9,380,219, which is a 371 national phase filing of PCT/US12/34236, filed Apr. 19, 2012, which claims the filing benefit of U.S. provisional application Ser. No. 61/477,315, filed Apr. 20, 2011, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data, that may be processed by an image processor, such as for a headlamp control or other machine vision system, or that may be displayed at a display screen that is viewable by the driver of the vehicle.

According to an aspect of the present invention, a vision system for a vehicle includes a camera or image sensor disposed at a windshield of a vehicle and having a field of view forward of the vehicle and through the windshield of the vehicle, and a processor operable to process data transmitted by the camera. The vision system or camera assembly or system includes an angular filter disposed at or near the windshield forward of the camera. The angular filter comprises a substantially transparent film that limits reflection of light through an angular range that generally corresponds to the stray light that reflects off of the vehicle (such as off of the vehicle dashboard) and would otherwise impinge the camera lens aperture.

The camera is electrically connected to circuitry established at a circuit board that is mounted generally along the windshield behind the camera, and the camera preferably is electrically connected to the circuitry via a flexible electrical connector. The flexible electrical connector flexes to allow a viewing angle of the camera to be adjusted relative to a mounting angle of the circuit board.

Therefore, the present invention provides an angular light filter that rejects or substantially rejects or attenuates reflections from the vehicle dash board into the camera. The angular filter replaces the stray light cone or shroud of a typical module or housing, allowing greater flexibility and lower mounting of the camera at the windshield.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a forward (or rearward) direction.

Figure 1:
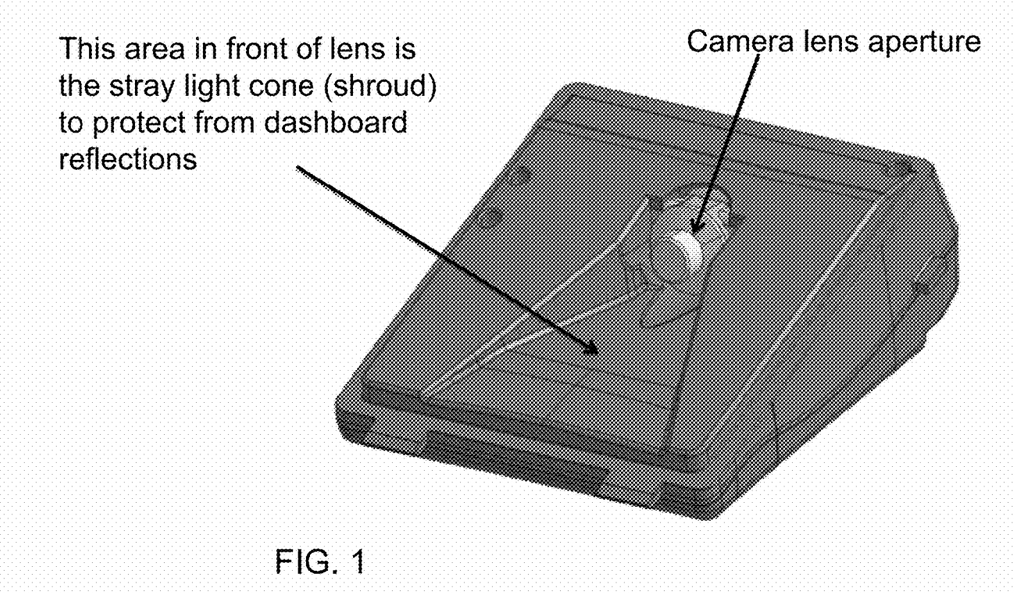
FIG. 1 is a perspective view of a camera disposed at a module that attaches at an interior surface of a vehicle windshield and that includes a stray light cone in front of the camera as part of the module or housing.
Figure 2:
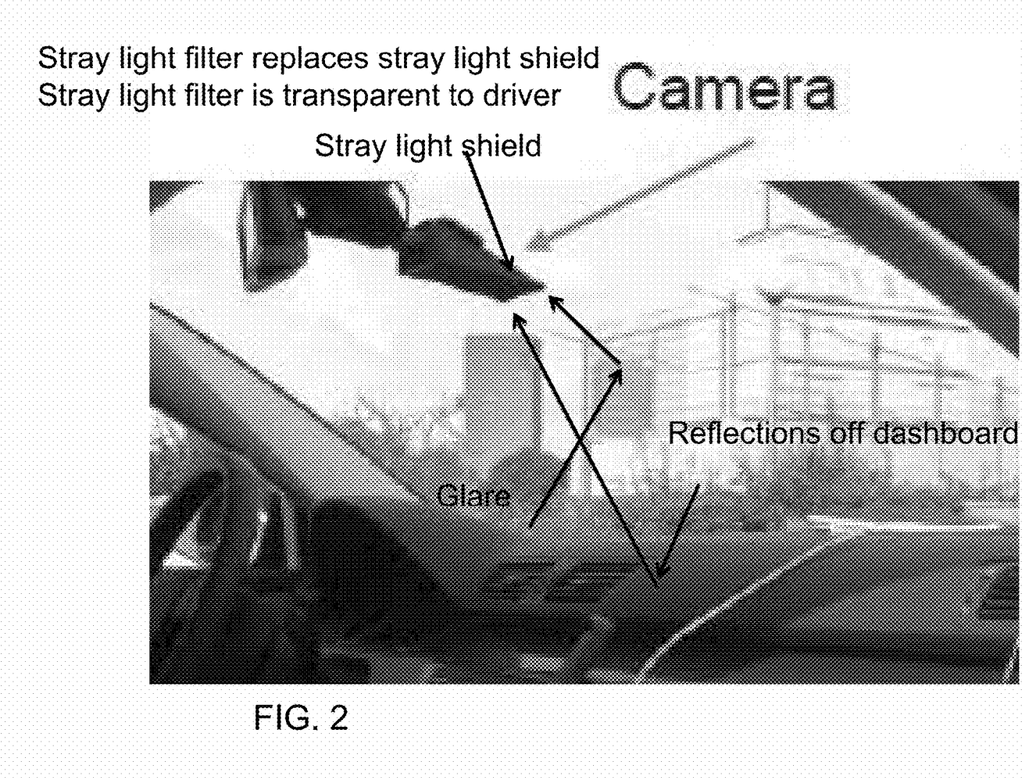
FIG. 2 is a perspective view of the camera module of FIG. 1, shown with the module mounted at a vehicle windshield with the stray light cone extending forward from the camera and along the windshield.

Front facing vehicular cameras include optical elements that constitute the camera. These elements are typically mounted in a vehicular camera housing, such as a windshield electronics module housing or the like, such as shown in FIGS. 1 and 2 (and such as a housing that utilizes aspects of the vision systems described in U.S. Pat. Nos. 7,526,103; 7,480,149; 7,188,963; 6,824,281; 6,341,523; 6,250,148; 6,516,664 and/or 6,968,736, which are hereby incorporated herein by reference in their entireties). As can be seen with reference to FIGS. 1 and 2, the housing may extend forward of the camera lens aperture and includes a stray light cone or shroud which serves to insulate the camera lens aperture from stray light that arises from reflections off the dashboard and/or windshield. Such housings are typically relatively bulky compared to the optical elements of the camera and thus the housing may occupy a considerable amount of windshield real estate or space. It thus may be desirable to eliminate the housing, or at least minimize the extent of the camera housing, so as to free up space on the windshield. This would not only provide better aesthetics, but also increased visibility through the windshield for the driver of the vehicle.

Figure 3:
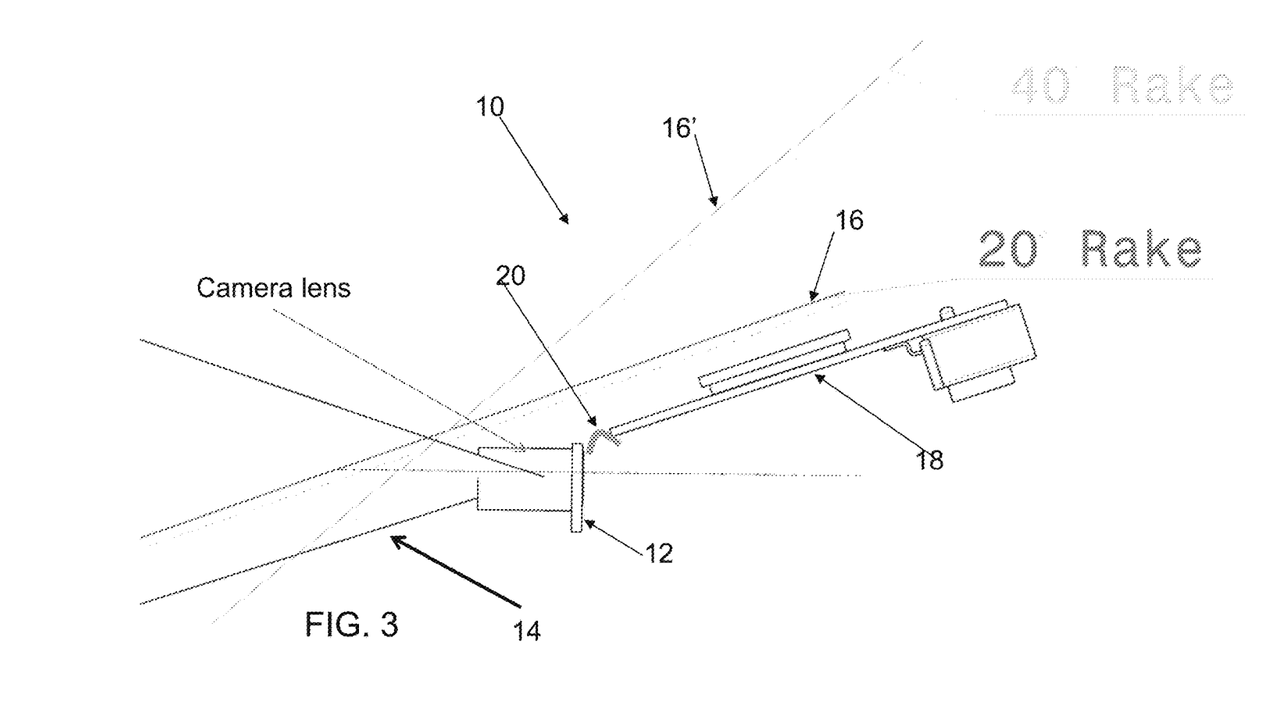
FIG. 3 is a sectional view of a camera assembly or system with an angular light filter disposed along the windshield in front of the camera in accordance with the present invention.

As shown in FIG. 3, the present invention proposes to eliminate the stray light cone or shroud and minimize the camera housing so that the housing only contains the optical elements of the camera and any necessary interfacing elements. At the very least, the present invention seeks to eliminate the stray light cone or shroud so that there is a minimum of the camera housing projecting forward of the camera lens aperture. Instead of a stray light cone or shroud, the camera or vision system 10 of the present invention includes a camera 12, with an angular filter 14 placed on or near the windshield 16 forward of the camera 12 and the camera lens aperture (and not part of or incorporated in a camera housing of a windshield electronics module or the like). The angular filter 14 comprises a transparent (or substantially transparent or light transmitting) or see-through film, which limits or substantially precludes reflection of light through an angular range corresponding to the stray light that would otherwise impinge the camera lens aperture.

The angular filter 14 may comprise any suitable materials. For example, a suitable film material may be found on the likes of computer notebook screens and other types of display monitors and are commercially available from the 3M Company and other suppliers. In some embodiments, the filter may be placed directly on the windshield, and in other embodiments (and such as shown in FIG. 3) the filter may be spaced apart from the windshield surface on a plane just below the camera lens aperture, in which case the filter may be mounted on a transparent substrate (not shown) or the like. Optionally, the filter may be provided in the form of anti-reflective coating on the windshield, which acts to prevent reflections from the windshield.

With the proposed structure, the designer of the camera system or vision system is afforded a great deal of design flexibility. In particular, and as can be seen with reference to FIG. 3, it will be appreciated that the printed circuit board 18 and other electronic components may be housed and disposed rearward of the camera optical elements and placed higher up on or along or near the windshield or even hidden all together under the vehicle roof liner.

Optionally, and as shown in FIG. 3, a flexible coupling 20 may also be provided between the small camera 12 and the printed circuit board 18. With such a flexible coupling (which electrically connects circuitry of the circuit board with circuitry of the camera to power and/or control the camera and to receive image data from the camera), the present invention may provide a universal or substantially universal solution to many vehicles which may all have different windshield rake angles. For example, and as can be seen with reference to FIG. 3, the flexible coupling 20 may flex to allow the camera 12 to be arranged generally horizontally when the circuit board 18 is mounted along (and generally parallel to) the windshield 16, such as, for example, along a windshield that has a rake angle of about 20 degrees, and the flexible coupling 20 may be adjusted or flexed to allow the camera 12 to be arranged generally horizontally when the circuit board 18 is mounted along a different windshield 16', such as, for example, along a windshield that has a rake angle of about 40 degrees. The flexible electrical connector thus flexes to allow a viewing angle of the camera to be adjusted relative to a mounting angle of the circuit board, depending on the particular vehicle application of the camera system. Thus, a common camera assembly or system 10 may be provided that may readily be adapted or configured for application to vehicles with different windshield angles (with the flexible coupling or flex connection allowing for adjustment of the angular tilt or relative angles between the camera and lens axis and the circuit board), without requiring additional mounting bracketry and the like to adapt the assembly to the particular vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. provisional application Ser. No. 61/565,713, filed Dec. 1, 2011; and/or Ser. No. 61/563,965, filed Nov. 28, 2011, which are hereby incorporated herein by reference in their entireties.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094 and/or 6,396,397, and/or U.S. provisional applications, Ser. No. 61/615,410, filed Mar. 26, 2012; Ser. No. 61/613,651, filed 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/559,970, filed Nov. 15, 2011; Ser. No. 61/552,167, filed Oct. 27, 2011; Ser. No. 61/540,256, filed Sep. 28, 2011; Ser. No. 61/513,745, filed Aug. 1, 2011; Ser. No. 61/511,738, filed Jul. 26, 2011; and/or Ser. No. 61/503,098, filed Jun. 30, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, and/or U.S. provisional applications, Ser. No. 61/567,150, filed Dec. 6, 2011; Ser. No. 61/565,713, filed Dec. 1, 2011; and/or Ser. No. 61/537,279, filed Sep. 21, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170; and/or U.S. provisional applications, Ser. No. 61/511,738, filed Jul. 26, 2011; and/or Ser. No. 61/503,098, filed Jun. 30, 2011, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008; and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760, 962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018-A1, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety). Optionally, the vision system (utilizing a forward and/or rearward facing camera and other cameras disposed at the vehicle with exterior fields of view) and/or the camera or cameras as part of a vehicle vision system comprising or utilizing a plurality of cameras (such as utilizing a rearward facing camera and sidewardly facing cameras and a forwardly facing camera disposed at the vehicle), may provide a display of a top-down view or birds-eye view of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US11/62834, filed Dec. 1, 2011 and published Jun. 7, 2012 as International Publication No. WO 2012-075250, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; Ser. No. 61/559,970, filed Nov. 15, 2011; Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vision system for a vehicle, said vision system comprising:
   a camera disposed at a vehicle and having a field of view exterior of the vehicle;
   wherein said camera comprises (i) a CMOS imaging array sensor and (ii) a lens;
   wherein said camera is operable to capture image data;
   an angular filter disposed at least partially in the field of view of said camera
   wherein said angular filter limits reflection of light through an angular range that corresponds to stray light that would otherwise impinge said lens of said camera;
   a control comprising an image processor operable to process image data captured by said camera;
   wherein, responsive at least in part to processing at said image processor of image data captured by said camera, said control controls a driver assistance system of the vehicle; and
   wherein said driver assistance system comprises a driver assistance system selected from the group consisting of (i) a headlamp control system of the vehicle, (ii) a lane change assistance system of the vehicle, (iii) a lane departure warning system of the vehicle, (iv) an object detection system of the vehicle, (v) a traffic sign recognition system of the vehicle and (vi) a distance determining system of the vehicle that is operable to determine a distance to a leading vehicle.

2. The vision system of claim 1, wherein said angular filter is disposed at a transparent substrate.

3. The vision system of claim 1, wherein said angular filter comprises an anti-reflective coating.

4. The vision system of claim 1, wherein said driver assistance system comprises a headlamp control system of the vehicle.

5. The vision system of claim 1, wherein said driver assistance system comprises a lane change assistance system of the vehicle.

6. The vision system of claim 1, wherein said driver assistance system comprises a lane departure warning system of the vehicle.

7. The vision system of claim 1, wherein said driver assistance system comprises an object detection system of the vehicle.

8. The vision system of claim 1, wherein said driver assistance system comprises a traffic sign recognition system of the vehicle.

9. The vision system of claim 1, wherein said driver assistance system comprises a distance determining system of the vehicle that is operable to determine a distance to a leading vehicle.

10. The vision system of claim 1, wherein said camera is disposed at a windshield of the vehicle and views forward of the vehicle through the windshield of the vehicle.

11. The vision system of claim 10, wherein said angular filter is disposed at an in-cabin surface of the windshield of the vehicle, and wherein said angular filter is spaced from the windshield of the vehicle.

12. The vision system of claim 10, wherein said angular filter comprises an anti-reflective coating on an in-cabin surface of the windshield of the vehicle.

13. The vision system of claim 10, wherein said angular filter is disposed at least partially below said lens.

14. The vision system of claim 10, wherein said camera is electrically connected to circuitry established at a circuit board that is mounted at the windshield of the vehicle behind said camera.

15. The vision system of claim 14, wherein said circuitry comprises said image processor.

16. A vision system for a vehicle, said vision system comprising:
    a camera disposed at an in-cabin surface of a windshield of a vehicle, wherein said camera views forward of the vehicle through the windshield of the vehicle and has a field of view exterior of the vehicle;
    wherein said camera comprises (i) a CMOS imaging array sensor and (ii) a lens;

wherein said camera is operable to capture image data;
wherein said camera is electrically connected to circuitry established at a circuit board that is mounted at the windshield of the vehicle behind said camera;
an angular filter disposed at least partially in the field of view of said camera
wherein said angular filter limits reflection of light through an angular range that corresponds to stray light that would otherwise impinge said lens of said camera;
a control comprising an image processor operable to process image data captured by said camera;
wherein said circuitry comprises said image processor;
wherein, responsive at least in part to processing at said image processor of image data captured by said camera, said control controls a driver assistance system of the vehicle; and
wherein said driver assistance system comprises a driver assistance system selected from the group consisting of (i) a headlamp control system of the vehicle, (ii) a lane change assistance system of the vehicle, (iii) a lane departure warning system of the vehicle, (iv) an object detection system of the vehicle and (v) a traffic sign recognition system of the vehicle.

17. The vision system of claim 16, wherein said angular filter is disposed at least partially below said lens.

18. A vision system for a vehicle, said vision system comprising:
a camera disposed at an in-cabin surface of a windshield of a vehicle, wherein said camera views forward of the vehicle through the windshield of the vehicle and has a field of view exterior of the vehicle;
wherein said camera comprises (i) a CMOS imaging array sensor and (ii) a lens;
wherein said camera is operable to capture image data;
wherein said camera is electrically connected to circuitry established at a circuit board;
an angular filter disposed at least partially in the field of view of said camera
wherein said angular filter limits reflection of light through an angular range that corresponds to stray light that would otherwise impinge said lens of said camera;
a control comprising an image processor operable to process image data captured by said camera;
wherein said circuitry comprises said image processor;
wherein, responsive at least in part to processing at said image processor of image data captured by said camera, said control controls a driver assistance system of the vehicle; and
wherein said driver assistance system comprises a driver assistance system selected from the group consisting of (i) a headlamp control system of the vehicle, (ii) a lane departure warning system of the vehicle, (iii) an object detection system of the vehicle, (iv) a traffic sign recognition system of the vehicle and (v) a distance determining system of the vehicle that is operable to determine a distance to a leading vehicle.

19. The vision system of claim 18, wherein said angular filter is spaced from the windshield of the vehicle.

* * * * *